United States Patent
Ryu

(10) Patent No.: US 11,729,685 B2
(45) Date of Patent: Aug. 15, 2023

(54) METHOD AND DEVICE FOR TRANSMITTING DATA IN CASE OF PDCP VERSION CHANGE IN WIRELESS COMMUNICATION SYSTEM

(71) Applicant: Samsung Electronics Co., Ltd., Suwon-si (KR)

(72) Inventor: Seungbo Ryu, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/978,167

(22) PCT Filed: Mar. 7, 2019

(86) PCT No.: PCT/KR2019/002641
§ 371 (c)(1),
(2) Date: Sep. 3, 2020

(87) PCT Pub. No.: WO2019/172669
PCT Pub. Date: Sep. 12, 2019

(65) Prior Publication Data
US 2021/0045029 A1   Feb. 11, 2021

(30) Foreign Application Priority Data

Mar. 7, 2018   (KR) .................... 10-2018-0026700

(51) Int. Cl.
*H04L 1/18* (2023.01)
*H04W 36/12* (2009.01)
*H04W 84/04* (2009.01)

(52) U.S. Cl.
CPC .............. *H04W 36/12* (2013.01); *H04L 1/18* (2013.01); *H04W 84/042* (2013.01)

(58) Field of Classification Search
CPC ....... H04L 1/1642; H04L 1/18; H04L 1/1874; H04L 67/42; H04L 69/28; H04W 36/12; H04W 80/02; H04W 80/08; H04W 36/18
(Continued)

(56) References Cited

U.S. PATENT DOCUMENTS 7,327,734 B2   2/2008   Yi et al.
8,335,189 B2   12/2012  Wang et al.
(Continued)

FOREIGN PATENT DOCUMENTS

KR   20100053000    *  5/2010
WO   2017/171919 A1    10/2017

OTHER PUBLICATIONS

Machine translation of KR-20100053000 (Year: 2010).*
(Continued)

*Primary Examiner* — Harun Chowdhury

(57) ABSTRACT

The present disclosure relates to a communication technique for converging a 5G communication system for supporting a higher data transfer rate beyond a 4G system with an IoT technology, and a system therefor. The present disclosure may be applied to intelligent services (for example, smart home, smart buildings, smart cities, smart cars or connected cars, health care, digital educations, retail business, security and safety-related services, etc.) on the basis of a 5G communication technology and an IoT-related technology. A method for transmitting data by a first communication device in the case of a packet data convergence protocol (PDCP) version change in a wireless communication system according to an embodiment of the present invention comprises the steps of: checking whether the PDCP version of a first PDCP entity for the first communication device is changed from the PDCP version of a second PDCP entity for a second communication device; when the PDCP version of the first PDCP entity is changed, identifying first data
(Continued)

transmitted by the second PDCP entity to a radio link control (RLC) entity for the second communication device; and transmitting second data to a third communication device on the basis of the first data and a data transmission mode configured for the first communication device.

12 Claims, 8 Drawing Sheets

(58) Field of Classification Search
USPC .......................................... 370/252, 315, 329
See application file for complete search history.

(56) References Cited

U.S. PATENT DOCUMENTS

| 9,014,139 | B2 | 4/2015 | Huang | |
|---|---|---|---|---|
| 2015/0215965 | A1 | 7/2015 | Yamada | |
| 2016/0269955 | A1* | 9/2016 | Lin | H04W 36/18 |
| 2016/0277154 | A1 | 9/2016 | Quan et al. | |
| 2017/0019945 | A1 | 1/2017 | Chiba et al. | |
| 2019/0357137 | A1* | 11/2019 | Shah | H04W 80/08 |
| 2020/0305225 | A1* | 9/2020 | Zhang | H04W 80/02 |
| 2021/0084129 | A1* | 3/2021 | Jiang | H04L 69/28 |

OTHER PUBLICATIONS

Supplementary European Search Report dated Sep. 14, 2020 in connection with European Application No. 19764937.9, 10 pages.
Oppo, et al., "Discussion on PDCP Version Reconfiguration in eLTE," R2-1801777, 3GPP TSG-RAN WG2#101, Athens, Greece, Feb. 26-Mar. 2, 2018, 4 pages.
Qualcomm Incorporated, "SRB1 PDCP version change for UEs connecting to 5GCN through E-UTRAN," R2-1712263, 3GPP TSG-RAN2 Meeting #100, Reno, USA, Nov. 27-Dec. 1, 2017, 4 pages.
Samsung, "PDCP operations during PDCP version change in EN-DC," R2-1711146, 3GPP TSG-RAN WG2 2017 RAN2#99bis Meeting, Prague, CZ, Oct. 9-13, 2017, 12 pages.
Samsung, "Lossless PDCP version change between LTE and NR", 3GPP TSG-RAN WG2 Meeting #99bis, Oct. 9-13, 2017, R2-1711781, 3 pages.
Sharp, "PDCP version change for MCG DRBs with handover", 3GPP TSG-RAN WG2 Meeting #99bis, Oct. 9-13, 2017, R2-1711816, 2 pages.
Qualcomm Incorporated, "Considerations on PDCP version change", 3GPP TSG-RAN WG2 Meeting #99bis, Oct. 9-13, 2017, R2-1711519, 2 pages.
International Search Report dated Jun. 20, 2019 in connection with International Patent Application No. PCT/KR2019/002641, 2 pages.
Written Opinion of the International Searching Authority dated Jun. 20, 2019 in connection with International Patent Application No. PCT/KR2019/002641, 4 pages.
Korean Intellectual Property Office, "Office Action," dated Oct. 28, 2022, in connection with Korean Patent Application No. 10-2018-0026700, 7 pages.
Intel, "Chairman notes," 3GPP TSG-RAN WG2 Meeting #99bis, Prague, Czech Republic, Oct. 9-13, 2017, 131 pages.
Korean Intellectual Property Office, "Office Action," issued May 25, 2023, in connection with Korean Patent Application No. 10-2018-0026700, 8 pages.

* cited by examiner

METHOD AND DEVICE FOR TRANSMITTING DATA IN CASE OF PDCP VERSION CHANGE IN WIRELESS COMMUNICATION SYSTEM

CROSS-REFERENCE TO RELATED APPLICATIONS

This application is a 371 of International Application No. PCT/KR2019/002641 filed on Mar. 7, 2019, which claims priority to Korean Patent Application No. 10-2018-0026700 filed on Mar. 7, 2018, the disclosures of which are herein incorporated by reference in their entirety.

BACKGROUND

1. Field

The disclosure relates to a method for transmitting data by a communication device in case of a packet data convergence protocol (PDCP) version change in a wireless communication system.

2. Description of Related Art

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LTE System." Implementation of the 5G communication system in ultrahigh frequency (mmWave) bands, e.g., 60 GHz bands, is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems. In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like. In addition, in the 5G system, hybrid FSK and QAM modulation (FQAM) and sliding window superposition coding (SWSC), as advanced coding modulation (ACM) systems, and filter bank multi carrier (FBMC), non-orthogonal multiple access(NOMA), and sparse code multiple access (SCMA), as advanced access technologies, have been developed.

On the other hand, the Internet, which is a human centered connectivity network where humans generate and consume information, is now evolving to the Internet of things (IoT) where distributed entities, such as things, exchange and process information without human intervention. The Internet of everything (IoE), which is a combination of IoT technology and big data processing technology through connection with a cloud server, has emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently researched. Such an IoT environment may provide intelligent Internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by beamforming, MIMO, and array antennas, which correspond to 5G communication technology. Application of a cloud radio access network (cloud RAN) as the above-described big data processing technology may also be considered to be an example of convergence between the 5G technology and the IoT technology.

On the other hand, in a wireless communication system, if it is required to change a packet data convergence protocol (PDCP) version in an inter system (e.g., 4G and 5G) network structure, the PDCP version should be changed through a data radio bearer (DRB) release and addition procedure, and thus a data loss may occur during performing of the above-described procedure.

The disclosure provides a method and a device for solving a data loss or data redundancy problem that may occur in case that a packet data convergence protocol (PDCP) version is changed.

SUMMARY

According to an embodiment of the disclosure, a method performed by a first communication device for transmitting data in case of a packet data convergence protocol (PDCP) version change in a wireless communication system includes identifying whether a PDCP version of a first PDCP entity for the first communication device is changed from a PDCP version of a second PDCP entity for a second communication device; identifying first data transmitted from the second PDCP entity to a radio link control (RLC) entity for the second communication device in case that the PDCP version of the first PDCP entity is changed; and transmitting second data to a third communication device based on the first data and a data transmission mode configured for the first communication device.

According to an embodiment, the method may further include determining the second data by excluding data for which an ack is sequentially received through an RLC automatic repeat request (ARQ) from the first data in case that the data transmission mode is a first acknowledged mode (AM mode).

According to another embodiment, the method may further include determining the second data by excluding the first data in case that the data transmission mode is a second AM mode.

According to still another embodiment, the method may further include receiving, from the second communication device, information indicating that a buffer of the RLC entity is in an empty state in case that the data transmission mode is a third AM mode; and determining the second data by excluding the first data in response to the information.

According to still another embodiment, the method may further include determining the second data by excluding data for which a first timer expires from the first data in case that the data transmission mode is a first unacknowledged mode (UM mode).

According to still another embodiment, the method may further include determining the second data by excluding the first data in case that the data transmission mode is a second UM mode.

According to still another embodiment, the method may further include determining the second data by excluding the first data in case that a second timer expires if the data transmission mode is a third UM mode.

According to an embodiment, the first PDCP entity and the second PDCP entity may be implemented by a common entity.

According to an embodiment, the method may further include giving a new sequence number to the second data.

According to an embodiment, in case that the third communication device performs a handover from the second communication device to the first communication device or the third communication device is in dual connectivity with respect to the first communication device and the second communication device in a state where the first communication device and the second communication device belong to different networks, respectively, the PDCP version of the first PDCP entity may be changed from the PDCP version of the second PDCP entity.

According to an embodiment, identifying the first data may include receiving data transmission state information from the second communication device; and determining the first data transmitted from the second PDCP entity to the RLC entity based on the data transmission state information.

According to an embodiment, the method may further include receiving PDCP state information received by the third communication device; and determining the second data by excluding data that the third communication device has successfully received from the second communication device based on the PDCP state information.

According to an embodiment, if the first communication device and the second communication device are implemented by different base stations, the third communication device may be implemented by a terminal, and if the first communication device and the second communication device are implemented by different terminals, the third communication device may be implemented by a base station.

According to an embodiment of the disclosure, a first communication device for transmitting data in case of a packet data convergence protocol (PDCP) version change in a wireless communication system includes a transceiver; and a controller coupled with the transceiver, and configured to: identify whether a PDCP version of a first PDCP entity for the first communication device is changed from a PDCP version of a second PDCP entity for a second communication device, identify first data transmitted from the second PDCP entity to a radio link control (RLC) entity for the second communication device in case that the PDCP version of the first PDCP entity is changed, and control to transmit second data to a third communication device based on the first data and a data transmission mode configured for the first communication device.

The method and the device for transmitting data according to an embodiment of the disclosure can improve the data transmission/reception quality by preventing a data loss or data redundancy problem that may occur in case that a packet data convergence protocol (PDCP) version is changed.

DETAILED DESCRIPTION

Figure 1:
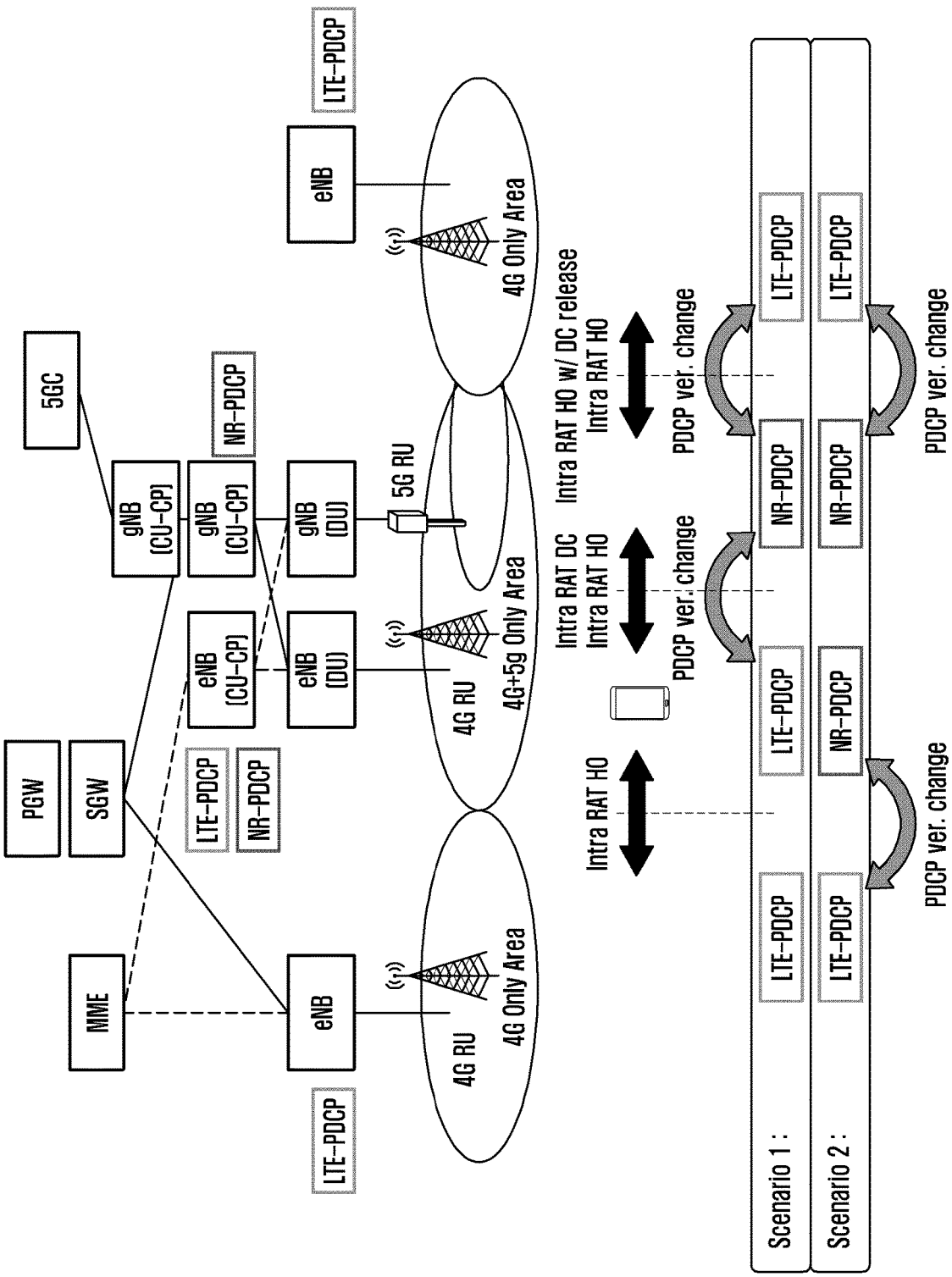
FIG. 1 is a diagram illustrating a process in which a packet data convergence protocol (PDCP) version of a base station is changed in a wireless communication system.

Hereinafter, preferred embodiments of the disclosure will be described in detail with reference to the accompanying drawings. In the accompanying drawings, it is to be noted that the same constituent elements are denoted by the same reference numerals if possible. Further, detailed explanation of known functions and configurations that may obscure the subject matter of the disclosure will be omitted.

The main subject matter of the disclosure can also be applied even to other communication systems having similar technical backgrounds or channel types through slight modifications thereof within a range that does not greatly deviate from the scope of the disclosure by the judgment of those skilled in the art to which the disclosure pertains.

In explaining embodiments in the description, explanation of technical contents that are well known in the art to which the disclosure pertains and are not directly related to the disclosure will be omitted. This is to transfer the subject matter of the disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the description, such as the detailed construction and elements, are only specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing equipment, such that the instructions, which execute via the processor of the computer or other programmable data processing equipment, create means for implementing the functions specified in the flowchart block or blocks. These computer program instructions may also be stored in a computer-usable or computer-readable memory that can direct a computer or other programmable data processing equipment to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing equipment to cause a series of operational steps to be performed on the computer or other programmable equipment to produce a computer implemented process such that the instructions that execute on the computer or other programmable equipment provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as FPGA or ASIC, which performs certain tasks. However, "~unit" is not meant to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card.

The disclosure relates to a method in which a base station and a terminal transmit and receive data without a loss in case that a packet data convergence protocol (PDCP) version is changed in an inter radio access technology (RAT) (e.g., 4G and 5G) dual connectivity or intra RAT (e.g., 4G or 5G) handover operation.

First, prior to the detailed explanation of the disclosure, terms to be used in the description may be summarized as follows.

NB: Node-B (e.g., eNB or gNB)

S-NB: Source NB in case of a packet data convergence protocol (PDCP) version change T-NB: Target NB in case of a PDCP version change LTE-PDCP: PDCP entity that observes a PDCP format based on the long term evolution (LTE) standard NR-PDCP: PDCP entity that observes a PDCP formation based on the new radio (NR) standard C-PDCP: Common PDCP entity that observes all PDCP formats based on the LTE and NR standards and can be used in a plurality of base stations (e.g., Source NB and Target NB)

NB-PDCP: PDCP entity in Node-B

NB-RLC: Radio link control (RLC) entity in Node-B

NB-MAC: Medium access control (MAC) entity in Node-B

UE-PDCP: PDCP entity in user equipment (UE)

UE-RLC: RLC entity in UE

UE-MAC: MAC entity in UE

S-PDCP: PDCP entity existing in a source NB in case of a PDCP version change

T-PDCP: PDCP entity existing in a target NB in case of a PDCP version change

S-RLC: RLC entity existing in a source NB in case of a PDCP version change

T-RLC: RLC entity existing in a target NB in case of a PDCP version change

DC: Dual connectivity

HO: Handover

FIG. 1 is a diagram illustrating a process in which a packet data convergence protocol (PDCP) version of a base station is changed in a wireless communication system.

With reference to FIG. 1, a wireless communication system may include a mobility management entity (MME), a serving gateway (SGW), a packet data network gateway (PGW), and a plurality of base stations (eNBs or gNBs).

According to an interworking-based cellular wireless communication system in the related art, the PDCP version should be changed through a data radio bearer (DRB) release and addition procedure in an inter system (e.g., 4G and 5G) network structure, and thus a data loss may occur during performing of the procedure.

In case that an eLTE eNB base station (capable of operating the PDCP version in an NR or LTE) and an NR base station coexist with a legacy LTE base station, two kinds of scenarios in which the PDCP version is changed may be generally considered as follows.

(Scenario 1) In case that a legacy eNB and an eLTE eNB initially apply an LTE-PDCP in a PDCP version: A PDCP change procedure is necessary during a DC procedure in order to perform an inter RAT DC. Further, the PDCP change procedure is necessary during an intra RAT HO to a legacy LTE in an inter RAT DC operation. Further, the PDCP change procedure is necessary in a HO procedure in order to perform an inter RAT HO.

(Scenario 2) In case that a legacy eNB and an eLTE eNB initially apply an LTE-PDCP and an NR-PDCP, respectively, in a PDCP version: A PDCP change procedure is necessary during an intra RAT HO to a legacy LTE in an inter RAT DC operation or during a connection with the eLTE eNB.

Further, the PDCP change procedure is necessary during an inter RAT HO to a legacy LTE during a connection with a gNB.

Further, although not mentioned in the drawing, a terminal can perform a PDCP change procedure with an eLTE eNB or a gNB without a HO or DC procedure.

Figure 2:
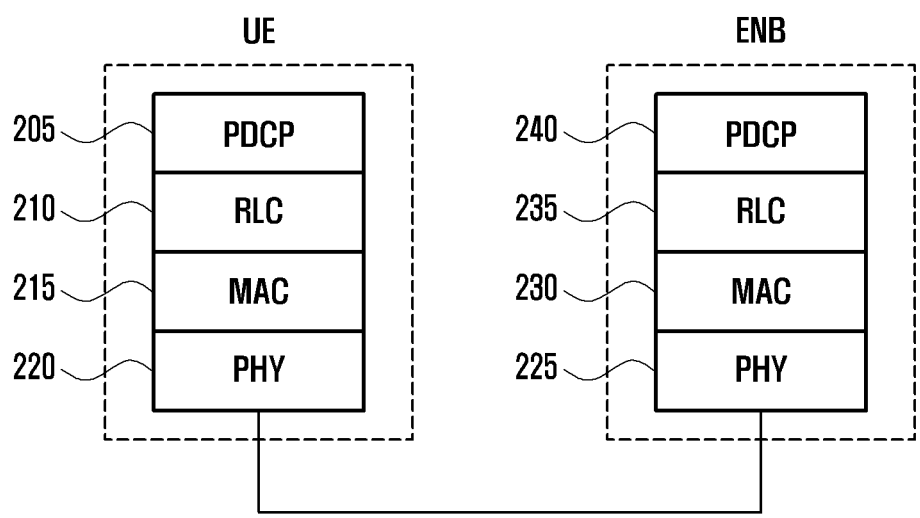
FIG. 2 is a diagram illustrating a radio protocol structure in a wireless communication system.

FIG. 2 is a diagram illustrating a radio protocol structure in a wireless communication system.

With reference to FIG. 2, in a terminal or a base station, a radio protocol of a wireless communication system includes a packet data convergence protocol (PDCP) 205 or 240, a radio link control (RLC) 210 and 235, and a medium access control (MAC) 215 or 230. The packet data convergence protocol (PDCP) 205 or 240 takes charge of IP header compression/decompression operations, and the radio link control (hereinafter, referred to as "RLC") 210 or 235 reconfigures a PDCP packet data unit (PDU) with a proper size.

The MAC 215 or 230 is coupled with several RLC layer devices configured in one terminal, and performs multiplexing/demultiplexing of RLC PDUs into/from a MAC PDU. The physical layer 220 or 225 performs channel coding and modulation of higher layer data to make and transmit OFDM symbols on a radio channel, or performs demodulation and channel decoding of the OFDM symbols received on the radio channel, and transfers the demodulated and channel-decoded symbols to a higher layer.

Further, even the physical layer uses a hybrid ARQ (HARQ) for an additional error correction, and a reception end transmits whether to receive a packet transmitted from a transmission end with 1 bit. This is called HARQ ACK/NACK information. Downlink HARQ ACK/NACK information for uplink transmission may be transmitted on a physical hybrid-ARQ indicator channel (PHICH), and uplink HARQ ACK/NACK information for downlink transmission may be transmitted on a physical uplink control channel (PUCCH) or a physical uplink shared channel (PUSCH).

In a DC or HO operation of an NB (e.g., eLTE eNB or gNB), a data transmission mode may be generally divided into an acknowledged mode (AM mode) and an unacknowledged mode (UM mode) when the PDCP version is changed.

Figure 3:
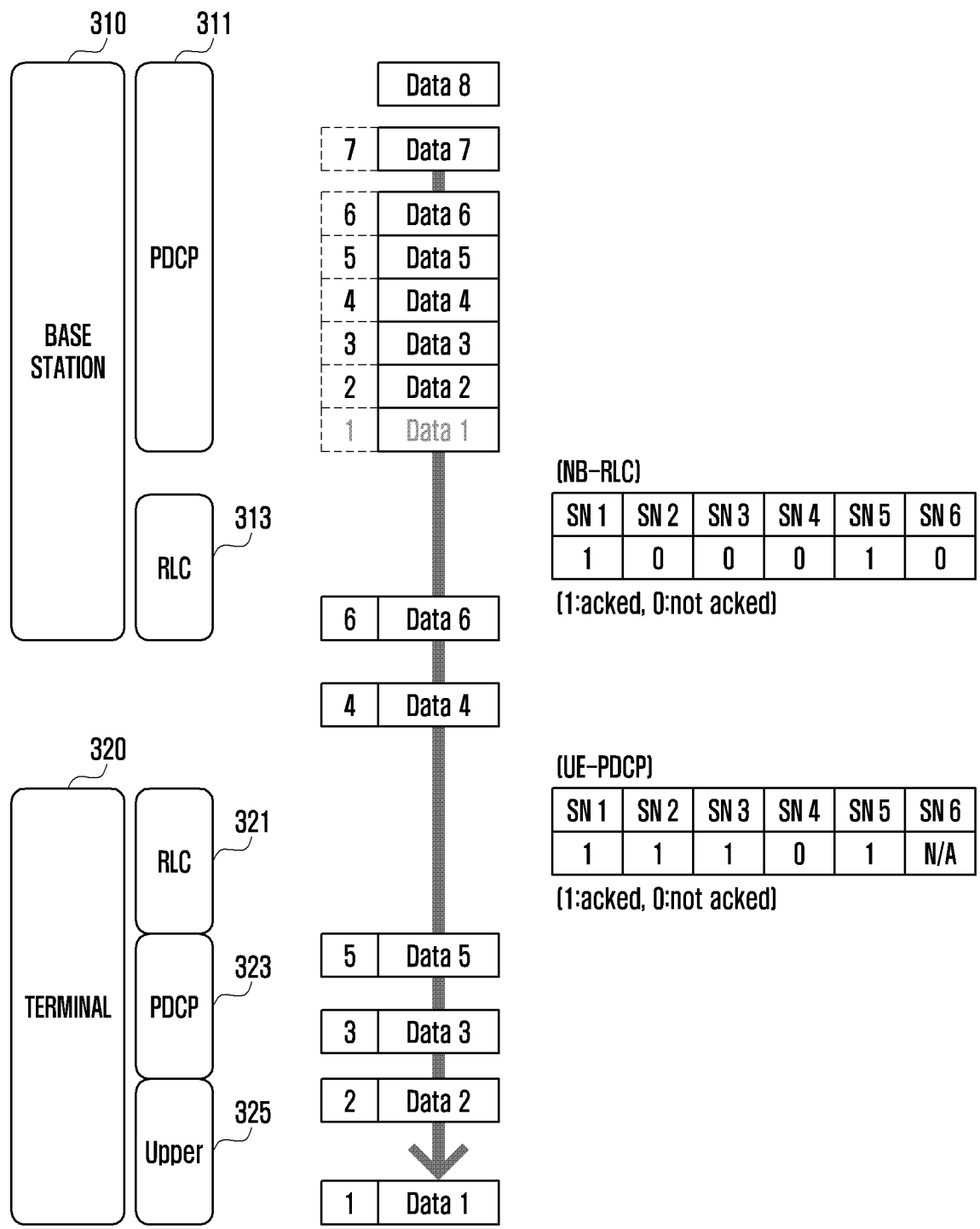
FIG. 3 is a diagram explaining a process in which a base station transmits data to a terminal in an acknowledged mode (AM mode) according to an embodiment of the disclosure.
Figure 4:
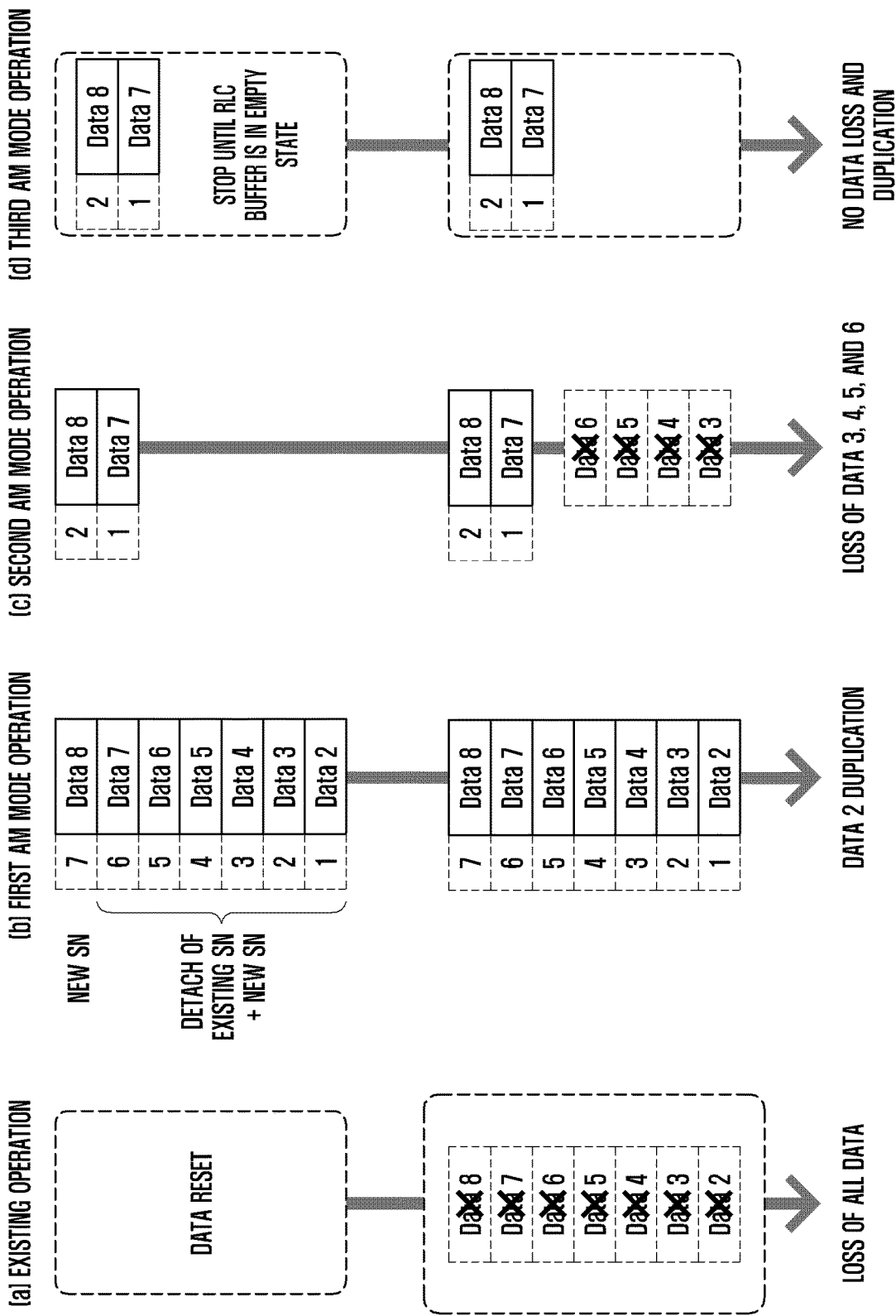
FIG. 4 is a diagram explaining a process in which a base station transmits data to a terminal in an acknowledged mode (AM mode) according to embodiments of the disclosure.
Figure 5:
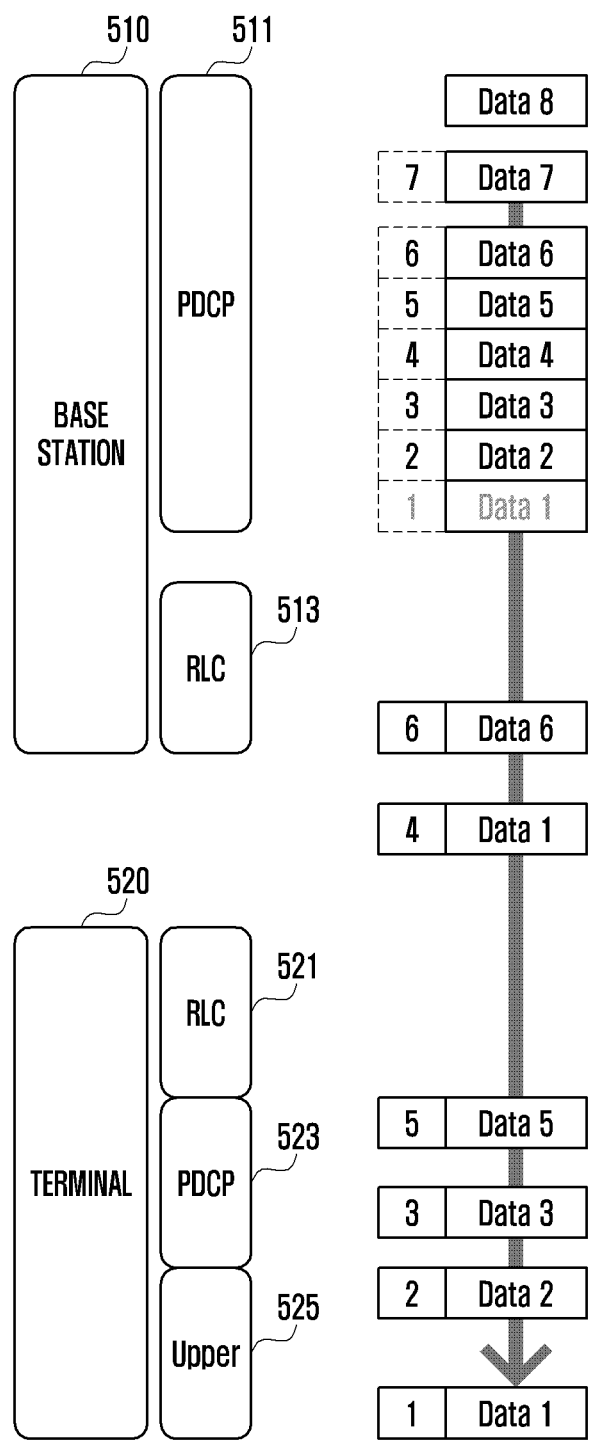
FIG. 5 is a diagram explaining a process in which a base station transmits data to a terminal in an unacknowledged mode (UM mode) according to an embodiment of the disclosure.
Figure 6:
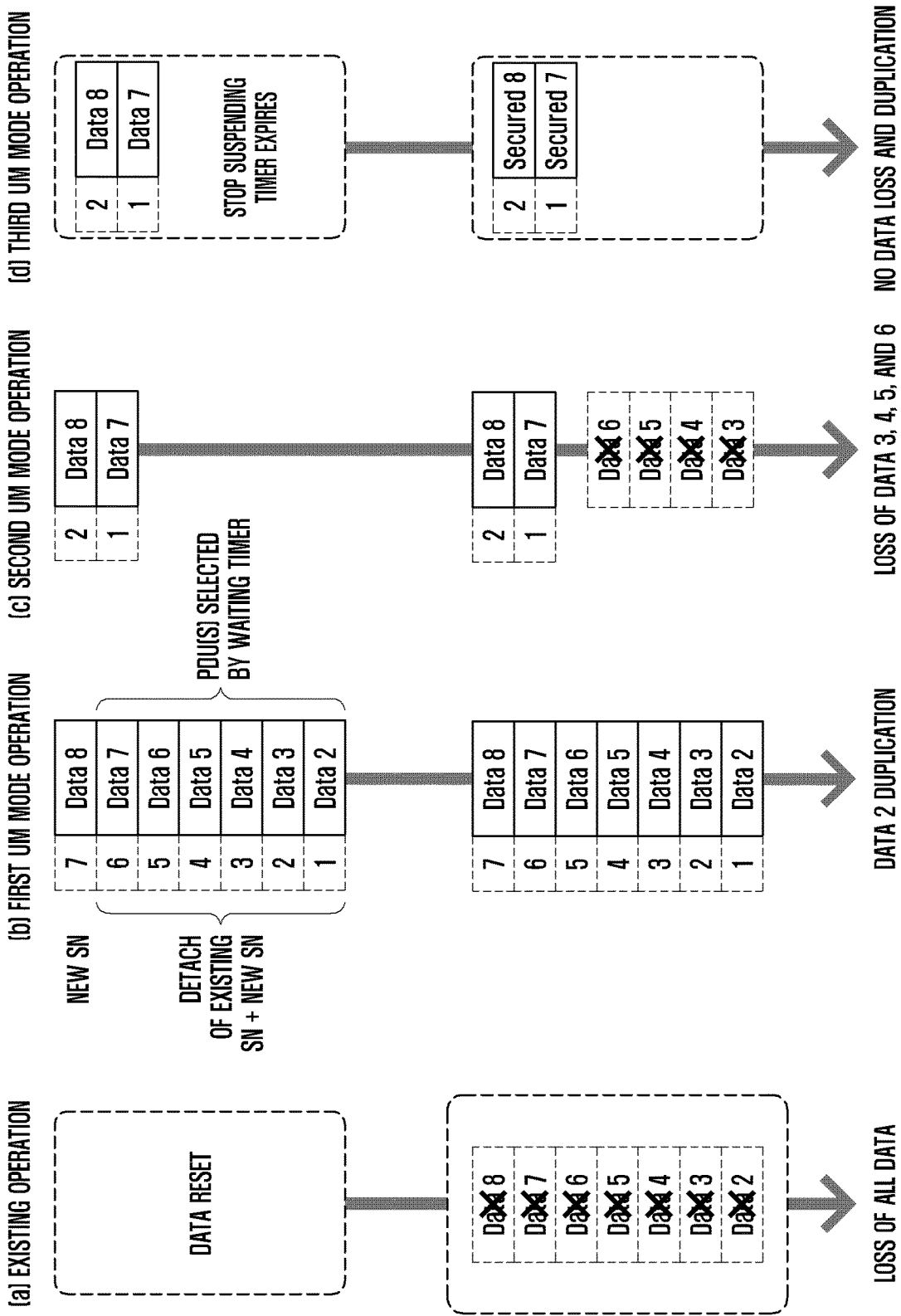
FIG. 6 is a diagram explaining a process in which a base station transmits data to a terminal in an unacknowledged mode (UM mode) according to embodiments of the disclosure.

FIGS. 3 and 4 illustrate a data transmission process in an AM mode according to embodiments of the disclosure, and FIGS. 5 and 6 illustrate a data transmission process in an UM mode according to embodiments of the disclosure.

FIGS. 3 to 6 of the description illustrate, for convenience in explanation, the technical idea of the disclosure based on a downlink data transmission from a base station to a terminal, but the disclosure is not limited thereto, and the technical idea of the disclosure is equally applicable to an uplink data transmission from the terminal to the base station.

FIG. 3 is a diagram explaining a process in which a base station transmits data to a terminal in an acknowledged mode (AM mode) according to an embodiment of the disclosure.

With reference to FIG. 3, a base station 310 may give sequence numbers to first data (Data 1) to seventh data (Data 7), and may sequentially transmit the data to a terminal 320 in the order of the sequence numbers through a PDCP layer 311 and an RLC layer 313 in the base station 310. The eighth data (Data 8) is fresh data that is not sequence-numbered.

In this case, the first data (Data 1), which the terminal 320 has successfully received from the base station 310, is transmitted up to an upper layer 325 in the terminal 320, and is data for which an ack has been transmitted from the terminal 320 to the base station 310. The second data (Data 2), which the terminal 320 has successfully received from the base station 310, is transmitted up to the upper layer 325 in the terminal 320, and is data for which an ack is being transmitted from the terminal 320 to the base station 310. The third data (Data 3), which the terminal 320 has successfully received from the base station 310, is transmitted up to the PDCP layer 323 in the terminal 320, and is data for which an ack is being transmitted from the terminal 320 to the base station 310.

The fourth data (Data 4) is being transmitted from the base station 310 to the terminal 320, and thus is data that currently exists in the air. The fifth data (Data 5), which the terminal 320 has successfully received from the base station 310, has been transmitted up to the PDCP layer 323 in the terminal 320, but has not yet been transmitted up to the upper layer 325 for reordering. The fourth data is data for which an ack has been transmitted from the terminal 320 to the base station 310.

The sixth data (Data 6) is data which has been transmitted up to the RLC layer 313 in the base station 310, but has not yet been transmitted to the terminal 320, and the seventh data (Data 7) is data that exists in the PDCP layer 311 in the base station 310 after the sequence numbering.

According to an embodiment, the base station 310 may transmit information on a downlink data delivery status indicating whether the base station 310 has successfully received the data having different sequence numbers from the terminal 320 to another base station or a higher layer (e.g., PDCP entity) in the same base station. For example, the base station 310 may be an S-NB, and the other base station may be a T-NB.

In FIG. 3, because the first data (Data 1) and the fifth data (Data 5) are data for which the ack has been transmitted from the terminal 320 to the base station 310, the base station 310 may transmit information on a downlink data delivery status in which the first sequence number SN1 and the fifth sequence number SN5 are indicated as "1" to another base station or a higher layer in the same base station.

According to an embodiment, the terminal 320 may transmit, to another base station, a PDCP status report indicating whether the PDCP layer 323 in the terminal 320 has successfully received the respective data having different sequence numbers. For example, the base station may be an S-NB, and the other base station may be a T-NB.

In FIG. 3, because the first data (Data 1) to the third data (Data 3) and the fifth data (Data 5) are data that the PDCP layer 323 in the terminal 320 has successfully received, the terminal 320 may transmit, to the other base station, a PDCP status report in which the first sequence number SN1 to the third sequence number SN3 and the fifth sequence number SN5 are indicated as "1".

FIG. 4 is a diagram explaining a process in which a base station transmits data to a terminal in an acknowledged mode (AM mode) according to embodiments of the disclosure.

When the packet data convergence protocol (PDCP) version is changed, the T-NB may transmit the second data to the terminal based on the first data transmitted from the S-PDCP to the S-RLC and a data transmission mode configured to the T-NB. In the disclosure, if the data transmission mode is the AM mode, three following modes may be defined.

First AM mode (Guaranteed Lossless & Duplicated Data Delivery): Data PDU is transmitted from a PDCP layer to an RLC layer, and remaining PDUs excluding PDUs for which an ack is sequentially received through an RLC automatic repeat request (ARQ) are retransmitted to the terminal.

Second AM mode (Minimized loss & No Duplicated Data Delivery): PDUs for which data PDU has not been transmitted from the PDCP layer to the RLC layer are retransmitted to the terminal.

Third AM mode (Guaranteed Lossless & No Duplicated Data Delivery): The PDCP layer retransmits Data PDU to the terminal after an RLC buffer becomes in an empty state through a suspend operation for a predetermined time in a state where the data PDU has been transmitted from the PDCP layer to the RLC layer.

In the related art, in case that a release and addition procedure is performed with respect to the existing DRB when the PDCP version is changed, data in the PDCP layer and the RLC layer in the base station is reset, and this may cause a problem that a loss of all data occurs in a RAN protocol stack.

In order to solve the above problem, according to the disclosure, the base station configures various data transmission modes, and thus the data loss can be effectively reduced.

With reference to FIGS. 3 and 4, in the first AM mode operation, the T-NB may give new sequence numbers to the second data (Data 2) to the eighth data (Data 8) excluding the first data (Data 1) for which the S-NB has received an ack through an RLC ARQ. Thereafter, the T-NB may transmit the second data (Data 2) to the eighth data (Data 8), to which the new sequence numbers have been given, to the terminal. In this case, although the second data (Data 2) is data transmitted up to the upper layer in the terminal as shown in FIG. 3, the T-NB may retransmit the second data in duplication.

The first AM mode is a mode in which user data is not lost, but may be transmitted to the terminal in duplication, and downlink and uplink based detailed procedures are as follows. First, a case where a source and a target NB operate respective PDCP entities (i.e., S-PDCP and T-PDCP) is as follows.

① PDCP version change (e.g., LTE PDCP from/to NR-PDCP) operations are triggered by a handover (e.g., inter NB handover) or dual connectivity (e.g., SgNB addition).

② An S-PDCP stops a downlink transmission from a PDCP layer to an RLC layer.

③ An S-PDCP requests and receives an RLC status PDU from an S-RLC, and identifies the current data transmission status.

④ An S-NB may request a PDCP status report from the terminal selectively through an RRC message or a polling bit in a PDCP header.

⑤ An S-PDCP may detach the sequence number SN that previously exists in the PDCP PDU.

⑥ The S-PDCP may transfer, to the T-PDCH, the PDU and SDU buffered using a GTP protocol and the SN of a GTP for order delivery between the S-BN and the T-NB.

⑦ If a PDCP status report is required, the S-PDCP creates Old-GTP SN mapping information and transmits the created information to the T-PDCP.

⑧ If the T-NB receives the PDCP status report from the UE, the T-PDCP of the T-NB detaches the duplicated PDU based on the Old-GTP SN mapping information.

⑨ The T-PDCP gives a new SN with respect to a PDU for which reception of a terminal feedback (e.g., ARQ acknowledgement) from the S-RLC has not been identified or a PDU that has not been transmitted to the S-RLC.

⑩ The T-PDCP attaches a new SN for new data from a GW.

⑪ The T-PDCP retransmits a PDCP PDU to the UE with new SN and PDCP version.

A case where a source and a target NB operate a common PDCP entity (e.g., C-PDCP) is as follows.

① PDCP version change (e.g., LTE PDCP from/to NR-PDCP) operations are triggered by a handover (e.g., inter NB handover) or a dual connectivity procedure (e.g., SgNB addition).

② The C-PDCP stops a DL transmission from the PDCP to the RLC layer.

③ The C-PDCP requests and receives an RLC status PDU from the S-RLC, and identifies the current data transmission status.

④ If selectively possible, the S-NB may request a PDCP status report from the UE through an RRC message or a polling bit of a PDCP header.

⑤ If possible, the C-PDCP detaches the existing SN in the PDCP PDU.

⑥ The C-PDCP attaches a new SN with respect to a PDU for which reception of a terminal feedback (e.g., ARQ acknowledgement) from the S-RLC has not been identified or a PDU that has not been transmitted to the S-RLC.

⑦ If the T-NB receives the PDCP status report from the UE, the C-PDCP detaches the duplicated PDU based on the Old-New SN mapping information.

⑧ The C-PDCP gives a new SN for new data from the GW.

⑨ The C-PDCP retransmits a PDCP PDU having new SN and PDCP version to the UE.

Based on an uplink, the S-PDCP or C-PDCP of the NB operates as follows.

① All uplink PDCP SDUs successfully received from the S-PDCP (or C-PDCP) in succession may be transmitted to the GW (minimum loss purpose).

With reference to FIGS. 3 and 4, in the second AM mode operation, the T-NB may give new sequence numbers to the seventh data (Data 7) and the eighth data (Data 8) excluding the first data (Data 1) to the sixth data (Data 6) transmitted from the S-PDCP to the S-RLC. Thereafter, the T-NB may transmit the seventh data (Data 7) and the eighth data (Data 8) to which the new sequence numbers have been given to the terminal. In this case, because the third data (Data 3) to the sixth data (Data 6) are data that have not been transmitted up to the upper layer in the terminal as shown in FIG. 3, they may be lost in the PDCP version change process.

The second AM mode is a mode in which user data may be partially lost, but the data is transmitted to the terminal so as to avoid data duplication, and downlink and uplink based detailed procedures are as follows.

First, a case where a source and a target NB operate respective PDCP entities (i.e., S-PDCP and T-PDCP) is as follows.

① PDCP version change (LTE PDCP from/to NR-PDCP) operations are triggered by a handover (e.g., inter NB handover) or dual connectivity procedure (e.g., SgNB addition).

② The S-PDCP stops a DL transmission from the PDCP to the RLC layer.

③ The S-PDCP requests and receives the RLC status PDU from the S-RLC, and identifies the current data transmission status.

④ If the existing sequence number SN is applied, the S-PDCP detaches the existing sequence number SN in the PDCP PDU.

⑤ The S-PDCP transfers the buffered PDCP PDU and SDU that have not been transmitted to the S-RLC to the T-PDCP using a GTP protocol and the SN of the GTP for transferring in the order between the S-BN and the T-NB.

⑥ The T-PDCP attaches a new SN to a PDU that has not been transmitted to the S-RLC.

⑦ The T-PDCP gives a new SN to new data from the GW.

⑧ The T-PDCP retransmits a PDCP PDU to the terminal with new SN and PDCP version.

A case where a source and a target NB operate a common PDCP entity (i.e., C-PDCP) is as follows.

① PDCP version change (LTE PDCP from/to NR-PDCP) operations are triggered by a handover (e.g., inter NB handover) or a dual connectivity procedure (e.g., SgNB addition).

② The C-PDCP stops a DL transmission from the PDCP to the RLC layer.

③ The C-PDCP requests and receives an RLC status PDU from the S-RLC, and identifies the current data transmission status.

④ If the existing sequence number SN is applied, the C-PDCP detaches the existing sequence number SN in the PDCP PDU.

⑤ The C-PDCP attaches a new SN with respect to a stored PDU that has not been transmitted to the S-RLC.

⑥ The C-PDCP attaches a new SN with respect to new data from the GW.

⑦ The C-PDCP retransmits the PDCP PDU having new SN and PDCP version to the terminal.

Based on an uplink, the S-PDCP or C-PDCP of the NB operates as follows.

① All uplink PDCP SDUs sequentially and successfully received may be transmitted to the GW (loss minimization purpose).

With reference to FIGS. 3 and 4, in the third AM mode operation, the S-NB stops the S-PDCP operation until the buffer of the S-RLC becomes in an empty state, and after the buffer of the S-RLC becomes in the empty state, the T-NB may give new sequence numbers to the seventh data (Data 7) and the eighth data (Data 8) excluding the first data (Data 1) to the sixth data (Data 6) transmitted from the S-PDCP to the S-RLC. Thereafter, the T-NB may transmit the seventh data (Data 7) and the eighth data (Data 8) to which the new sequence numbers have been given to the terminal.

In this case, because a case where the buffer of the S-RLC becomes in the empty state means (or assumes) that the first data (Data 1) to the sixth data (Data 6) have been transmitted up to the upper layer in the terminal, it is advantageous that the data loss and duplication do not occur in the third AM mode. However, during the operation in the third AM mode, the PDCP version change is deferred until the buffer of the S-RLC becomes in the empty state, and thus it takes more time to perform the operation in the third AM mode in comparison with other modes.

The third AM mode is a mode in which data is transmitted to the terminal so as to avoid the user data loss and duplication, and downlink and uplink based detailed procedures are as follows.

First, a case where a source and a target NB operate respective PDCP entities (i.e., S-PDCP and T-PDCP) is as follows.

① PDCP version change (e.g., LTE PDCP from/to NR-PDCP) operations are triggered by a handover (e.g., inter NB handover) or dual connectivity procedure (e.g., SgNB addition).

② The S-PDCP stops the DL transmission from the PDCP to the RLC layer.

③ The S-PDCP requests and receives the RLC status PDU from the S-RLC, and identifies the current data transmission status.

④ The S-RLC notifies the S-PDCP that all data have been transmitted and the buffer is in an empty state.

⑤ If the existing sequence number SN is applied, the S-PDCP detaches the existing sequence number SN in the PDCP PDU.

⑥ The S-PDCP forwards the buffered PDCP PDU and SDU to the T-PDCP using a GTP protocol and the SN of the GTP for transferring in the order between the S-BN and the T-NB.

⑦ The T-PDCP attaches a new SN to a PDU that has not been transmitted to the S-RLC.

⑧ The T-PDCP attaches a new SN to new data from the GW.

⑨ The T-PDCP retransmits a PDCP PDU to the terminal with new SN and PDCP version.

A case where a source and a target NB operate a common PDCP entity (i.e., C-PDCP) is as follows.

① PDCP version change (e.g., LTE PDCP from/to NR-PDCP) operations are triggered by a handover (e.g., inter NB handover) or a dual connectivity procedure (e.g., SgNB addition).

② The C-PDCP stops the DL transmission from the PDCP to the RLC layer.

③ The C-PDCP requests and receives an RLC status PDU from the S-RLC, and identifies the current data transmission status.

④ The S-RLC notifies the C-PDCP that all data have been transmitted and the buffer is in an empty state.

⑤ If the existing sequence number SN is applied, the C-PDCP detaches the existing SN in the PDCP PDU.

⑥ The C-PDCP attaches a new SN with respect to the stored PDU that has not been transmitted to the S-RLC.

⑦ The C-PDCP attaches a new SN to new data from the GW.

⑧ The C-PDCP retransmits a PDCP PDU having the new NS and PDCP version to the terminal.

Based on an uplink, the S-PDCP or C-PDCP of the NB operates as follows.

① All uplink PDCP SDUs sequentially and successfully received by the S-PDCP (or C-PDCP) may be transmitted to the GW (minimum loss purpose).

All the AM mode processes are based to be triggered by the handover (e.g., inter NB handover) or the dual connectivity procedure (e.g., SgNB addition), and in case of triggering the PDCP change procedure between the terminal and the eLTE eNB or the gNB without the HO or DC procedure, the remaining operations excluding ① are the same as those in the above-described processes, and the PDCP or the RLC that is divided into the source and the target in one NB, rather than the NB that is divided into the source and the target, will operate in one PDCP or an RLC.

FIG. 5 is a diagram explaining a process in which a base station transmits data to a terminal in an unacknowledged mode (UM mode) according to an embodiment of the disclosure.

In contrast with the AM mode illustrated in FIG. 3, in the UM mode illustrated in FIG. 5, the terminal does not transmit ack/nack indicating whether a data reception has succeeded to the base station.

With reference to FIG. 5, a base station 510 may give sequence numbers to first data (Data 1) to seventh data (Data 7), and may sequentially transmit the data to a terminal 520 in the order of the sequence numbers through a PDCP layer 511 and an RLC layer 513 in the base station 510. The eighth data (Data 8) is fresh data that is not sequence-numbered.

In this case, the first data (Data 1) and the second data (Data 2) are data which the terminal 520 has successfully received from the base station 510, and are transmitted up to an upper layer 525 in the terminal 520. The third data (Data 3) is data which the terminal 520 has successfully received from the base station 510, and is transmitted up to the PDCP layer 523 in the terminal 520.

The fourth data (Data 4) is being transmitted from the base station 510 to the terminal 520, and thus is data that currently exists in the air. The fifth data (Data 5) is data which the terminal 520 has successfully received from the base station 510, is transmitted up to the PDCP layer 523 in the terminal 520, but has not yet been transmitted up to the upper layer 525 for reordering.

The sixth data (Data 6) is data which has been transmitted up to the RLC layer 513 in the base station 510, but has not yet been transmitted to the terminal 520, and the seventh data (Data 7) is data that exists in the PDCP layer 511 in the base station 510 after the sequence numbering.

FIG. 6 is a diagram explaining a process in which a base station transmits data to a terminal in an unacknowledged mode (UM mode) according to embodiments of the disclosure.

When the packet data convergence protocol (PDCP) version is changed, the T-NB may transmit the second data to the terminal based on the first data transmitted from the S-PDCP to the S-RLC and a data transmission mode configured to the T-NB. In the disclosure, if the data transmission mode is the UM mode, three following modes may be defined.

First UM mode (Maximized Lossless & Duplicated Data Delivery): Data PDU is transmitted from a PDCP layer to an RLC layer, and is buffered, and PDUs are retransmitted to the terminal after a waiting operation for a predetermined time.

Second UM mode (Minimized loss & No Duplicated Data Delivery): PDUs for which data PDU has not been transmitted from the PDCP layer to the RLC layer are retransmitted to the terminal (the same operation as the operation in the second AM mode).

Third UM mode (Minimized Lossless & No Duplicated Data Delivery): The PDCP layer retransmits Data PDU to the terminal after a suspend operation for a predetermined time based on a timer in a state where the PDCP has transmitted the data PDU to the RLC layer.

In the related art, in case that the existing DRB passes through a release and addition procedure when the PDCP version is changed, data in the PDCP layer and the RLC layer in the base station is reset, and this may cause a problem that a loss of all data occurs in a RAN protocol stack.

In order to solve the above problem, according to the disclosure, the base station configures various data transmission modes, and thus the data loss can be effectively reduced.

With reference to FIGS. 5 and 6, in the first UM mode operation, the T-NB may give new sequence numbers to the second data (Data 2) to the eighth data (Data 8) excluding the first data (Data 1) for which a waiting timer expires. Thereafter, the T-NB may transmit the second data (Data 2) to the eighth data (Data 8), to which the new sequence numbers have been given, to the terminal. In this case, although the second data (Data 2) is data transmitted up to the upper layer in the terminal as shown in FIG. 3, the T-NB may retransmit the second data in duplication.

The first UM mode is a mode in which a loss of user data is minimized, but the data may be transmitted to the terminal in duplication, and downlink and uplink based detailed procedures are as follows.

First, a case where a source and a target NB operate respective PDCP entities (i.e., S-PDCP and T-PDCP) is as follows.

① The S-PDCP applies a waiting timer for respective PDCP PDUs and stores the PDCP PDUs in accordance with the waiting timer, but if the waiting time expires, the S-PDCP discards the PDCP PDUs.

② PDCP version change (e.g., LTE PDCP from/to NR-PDCP) operations are triggered by a handover (e.g., inter NB handover) or a dual connectivity procedure (e.g., SgNB addition).

③ The S-PDCP stops the DL transmission from the PDCP to the RLC layer.

④ The S-PDCP detaches the existing SN in the PDCP PDU if the existing sequence number SN has been applied.

⑤ If a GTP protocol is necessary, the S-PDCP forwards the stored PDCP PDU and SDU existing in the waiting time to the T-PDCP using the SN of the GTP for the transfer in the order between the S-BN and the T-NB.

⑥ The T-PDCP attaches a new SN with respect to the transferred PDU if necessary.

⑦ The T-PDCP gives a new SN to new data from the GW if necessary.

⑧ The T-PDCP retransmits the PDCP PDU to the terminal with the new SN and PDCP version.

A case where a source and a target NB operate a common PDCP entity (e.g., C-PDCP) is as follows.

① The C-PDCP applies a waiting timer for respective PDCP PDUs and stores the PDCP PDUs in accordance with the waiting timer, but if the waiting time expires, the S-PDCP discards the PDCP PDUs.

② PDCP version change (e.g., LTE PDCP from/to NR-PDCP) operations are triggered by a handover (e.g., inter NB handover) or a dual connectivity procedure (e.g., SgNB addition).

③ The C-PDCP stops the DL transmission from the PDCP to the RLC layer.

④ The C-PDCP detaches the existing SN in the PDCP PDU if the existing sequence number SN has been applied.

⑤ The C-PDCP attaches a new SN with respect to the stored PDU if necessary.

⑥ The C-PDCP attaches a new SN to new data from the GW if necessary.

⑦ The C-PDCP retransmits the PDCP PDU existing in the waiting timer having the new SN and PDCP version to the terminal.

Based on an uplink, the S-PDCP or C-PDCP of the NB operates as follows.

① All uplink PDCP SDUs sequentially and successfully received by the S-PDCP (or C-PDCP) may be transmitted to the GW (minimum loss purpose).

The UM mode process is based to be triggered by the handover (e.g., inter NB handover) or the dual connectivity procedure (e.g., SgNB addition), and in case of triggering the PDCP change procedure between the terminal and the eLTE eNB or the gNB base station without the HO or DC procedure, the remaining operations excluding ② are the same as those in the above-described processes, and the PDCP or the RLC that is divided into the source and the target in one NB, rather than the NB that is divided into the source and the target, will operate in one PDCP or an RLC.

With reference to FIGS. 5 and 6, in the second UM mode operation, the T-NB may give new sequence numbers to the seventh data (Data 7) and the eighth data (Data 8) excluding the first data (Data 1) to the sixth data (Data 6) transmitted from the S-PDCP to the S-RLC. Thereafter, the T-NB may transmit the seventh data (Data 7) and the eighth data (Data 8) to which the new sequence numbers have been given to the terminal. In this case, because the third data (Data 3) to the sixth data (Data 6) are data that have not been transmitted up to the upper layer in the terminal as shown in FIG. 5, they may be lost in the PDCP version change process.

The second UM mode is a mode in which user data may be partially lost, but the data is transmitted to the terminal so as to avoid data duplication, and downlink and uplink based detailed procedures are as follows.

First, a case where a source and a target NB operate respective PDCP entities (i.e., S-PDCP and T-PDCP) is as follows.

① PDCP version change (e.g., LTE PDCP from/to NR-PDCP) operations are triggered by a handover (e.g., inter NB handover) or dual connectivity procedure (e.g., SgNB addition).

② The S-PDCP stops a DL transmission from the PDCP to the RLC layer.

③ If the existing sequence number SN is applied, the S-PDCP detaches the existing sequence number SN in the PDCP PDU.

④ The S-PDCP transfers the buffered PDCP PDU and SDU that have not been transmitted to the S-RLC to the T-PDCP using a GTP protocol and the SN of the GTP for transferring in the order between the S-BN and the T-NB.

⑤ The T-PDCP attaches a new SN to a PDU that has not been transmitted to the S-RLC if necessary.

⑥ The T-PDCP attaches a new SN to new data from the GW if necessary.

⑦ The T-PDCP retransmits a PDCP PDU to the terminal with new SN and PDCP version.

A case where a source and a target NB operate a common PDCP entity (i.e., C-PDCP) is as follows.

① PDCP version change (e.g., LTE PDCP from/to NR-PDCP) operations are triggered by a handover (e.g., inter NB handover) or a dual connectivity procedure (e.g., SgNB addition).

② The C-PDCP stops a DL transmission from the PDCP to the RLC layer.

③ If the existing sequence number SN is applied, the C-PDCP detaches the existing sequence number SN in the PDCP PDU.

④ The C-PDCP attaches a new SN with respect to a stored PDU that has not been transmitted to the S-RLC if necessary.

⑤ The C-PDCP attaches a new SN with respect to new data from the GW if necessary.

⑥ The C-PDCP retransmits the PDCP PDU having the new SN and PDCP version to the terminal.

Based on an uplink, the S-PDCP or C-PDCP of the NB operates as follows.

① All uplink PDCP SDUs sequentially and successfully received may be transmitted to the GW (minimum loss purpose).

With reference to FIGS. 5 and 6, in the third UM mode operation, the S-NB stops the S-PDCP operation until a suspending timer expires, and after the expiration of the suspending timer, the T-NB may give new sequence numbers to the seventh data (Data 7) and the eighth data (Data 8) excluding the first data (Data 1) to the sixth data (Data 6) already transmitted from the S-PDCP to the S-RLC. Thereafter, the T-NB may transmit the seventh data (Data 7) and the eighth data (Data 8) to which the new sequence numbers have been given to the terminal.

In this case, because a case where the suspending timer expires means (or assumes) that the first data (Data 1) to the sixth data (Data 6) have been transmitted up to the upper layer in the terminal, it is advantageous that the data loss and duplication do not occur in the third UM mode. However, during the operation in the third UM mode, the PDCP version change is deferred until the suspending timer expires, and thus it takes more time to perform the operation in the third UM mode in comparison with other modes.

The third UM mode is a mode in which data is transmitted to the terminal so as to prevent or minimize the user data loss and to avoid data duplication, and downlink and uplink based detailed procedures are as follows.

First, a case where a source and a target NB operate respective PDCP entities (i.e., S-PDCP and T-PDCP) is as follows.

① PDCP version change (e.g., LTE PDCP from/to NR-PDCP) operations are triggered by a handover (e.g., inter NB handover) or dual connectivity procedure (e.g., SgNB addition).

② The S-PDCP stops the DL transmission from the PDCP to the RLC layer.

③ The S-NB stops the HO and DC procedures, and the S-PDCP starts (or executes) the suspending timer to complete the DL transmission from the S-RLC to the UE.

④ If the existing sequence number SN is applied, the S-PDCP detaches the existing SN in the PDCP PDU.

⑤ If the suspending timer expires, the S-NB resumes the HO and DC procedures.

⑥ The S-PDCP transmits the buffered PDCP PDU and SDU, which have not been transmitted to the S-RLC, to the T-PDCP using a GTP protocol and the SN of the GTP for transferring in the order between the S-BN and the T-NB.

⑦ The T-PDCP attaches a new SN to the transferred PDU if necessary.

⑧ The T-PDCP attaches a new SN to new data from the GW if necessary.

⑨ The T-PDCP retransmits a PDCP PDU to the terminal with the new SN and PDCP version.

A case where a source and a target NB operate a common PDCP entity (i.e., C-PDCP) is as follows.

① PDCP version change (e.g., LTE PDCP from/to NR-PDCP) operations are triggered by a handover (e.g., inter NB handover) or a dual connectivity procedure (e.g., SgNB addition).

② The S-NB stops the HO and DC procedures, and the C-PDCP starts (or executes) the suspending timer to complete the DL transmission from the S-RLC to the UE.

② The C-PDCP stops the DL transmission from the PDCP to the RLC layer.

③ If the existing sequence number SN is applied, the C-PDCP detaches the existing SN in the PDCP PDU.

④ If the suspending timer expires, the S-NB resumes the HO and DC procedures.

⑤ The C-PDCP attaches a new SN with respect to the stored PDU if necessary.

⑥ The C-PDCP attaches a new SN to new data from the GW if necessary.

⑦ The C-PDCP retransmits a PDCP PDU having the new NS and PDCP version to the terminal.

Based on an uplink, the S-PDCP or C-PDCP of the NB operates as follows.

① All uplink PDCP SDUs sequentially and successfully received by the S-PDCP (or C-PDCP) may be transmitted to the GW (minimum loss purpose).

All the UM mode processes are based to be triggered by the handover (e.g., inter NB handover) or the dual connectivity procedure (e.g., SgNB addition), and in case of triggering the PDCP change procedure between the terminal and the eLTE eNB or the gNB without the HO or DC procedure, the remaining operations excluding ① are the same as those in the above-described processes, and the PDCP or the RLC that is divided into the source and the target in one NB, rather than the NB that is divided into the source and the target, will operate in one PDCP or an RLC.

The detailed definitions of the waiting timer and the suspending timer as described above are described in the following tables.

TABLE

| Waiting Timer | |
|---|---|
| Start | Transmit PDCP PDU to S-RLC |
| Timer operation | Store PDCP PDU |
| Stop | Receive successful transfer of PDCP PDUs from RLC layer (e.g., ARQ feedback |
| Timer expiration | Store PDCP PDU(s) |
| Timer value | $T_{waiting\_timer}$ = CU – DU latency + S-RLC/MAC/PHY processing time + Air latency + UE PDCP/RLC/MAC/PHY processing time |

TABLE

| Suspending timer | |
|---|---|
| Start | Start PDCP version change by a handover or dual connectivity procedure, and transmit last PDCP PDU from S-PDCP to S-RLC |
| Timer operation | Temporarily stop HO and DC procedures including PDCP version change Temporarily stop DL transmission from PDCP to RLC layer Transmit data PDU from S-RLC to UE |
| Stop | Cancel HO and DC procedures |
| Timer expiration | Resume HO and DC procedures including PDCP version change |
| Timer value | $T_{suspending\_timer}$ = CU – DU latency + S-RLC/MAC/PHY processing time + Air latency + UE PDCP/RLC/MAC/PHY processing time |

Figure 7:
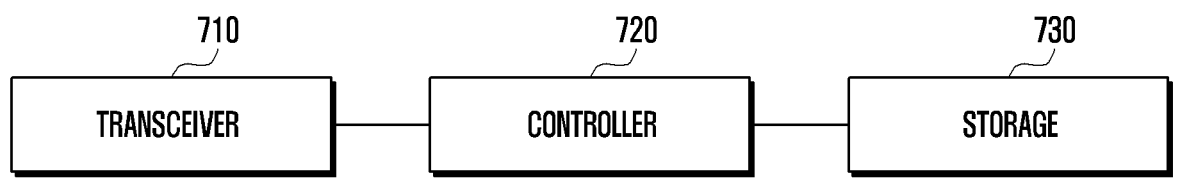
FIG. 7 is a diagram illustrating the structure of a communication device according to embodiments of the disclosure.

FIG. 7 is a diagram illustrating the structure of a communication device according to embodiments of the disclosure.

With reference to FIG. 7, a communication device may include a transceiver 710, a controller 720, and a storage 730. In the disclosure, the communication device may be implemented by the base station or the terminal as illustrated in FIGS. 1 to 6, and the controller may be defined as a circuit or an application-specific integrated circuit or at least one processor.

The transceiver 710 may transmit and receive signals to and from another communication device. For example, if the communication device is the terminal, the communication device may receive system information from the base station, and may receive a synchronization signal or a reference signal.

The controller 720 may control the overall operation of the communication device according to embodiments proposed in the disclosure. For example, the controller 720 may control a signal flow so as to perform the operations described in FIGS. 1 to 6.

According to an embodiment, the controller 720 may be configured to identify whether a PDCP version of a first PDCP entity for the first communication device (communication device of FIG. 7) is changed from a PDCP version of a second PDCP entity for a second communication device, identify first data transmitted from the second PDCP entity to a radio link control (RLC) entity for the second communication device if the PDCP version of the first PDCP entity is changed, and control to transmit second data to a third communication device based on the first data and a data transmission mode configured for the first communication device.

In this case, if the first communication device and the second communication device are implemented by different base stations, the third communication device may be implemented by a terminal, and if the first communication device and the second communication device are implemented by different terminals, the third communication device may be implemented by a base station.

The storage 730 may store at least one of information transmitted and received through the transceiver 710 and information created through the controller 720.

Figure 8:
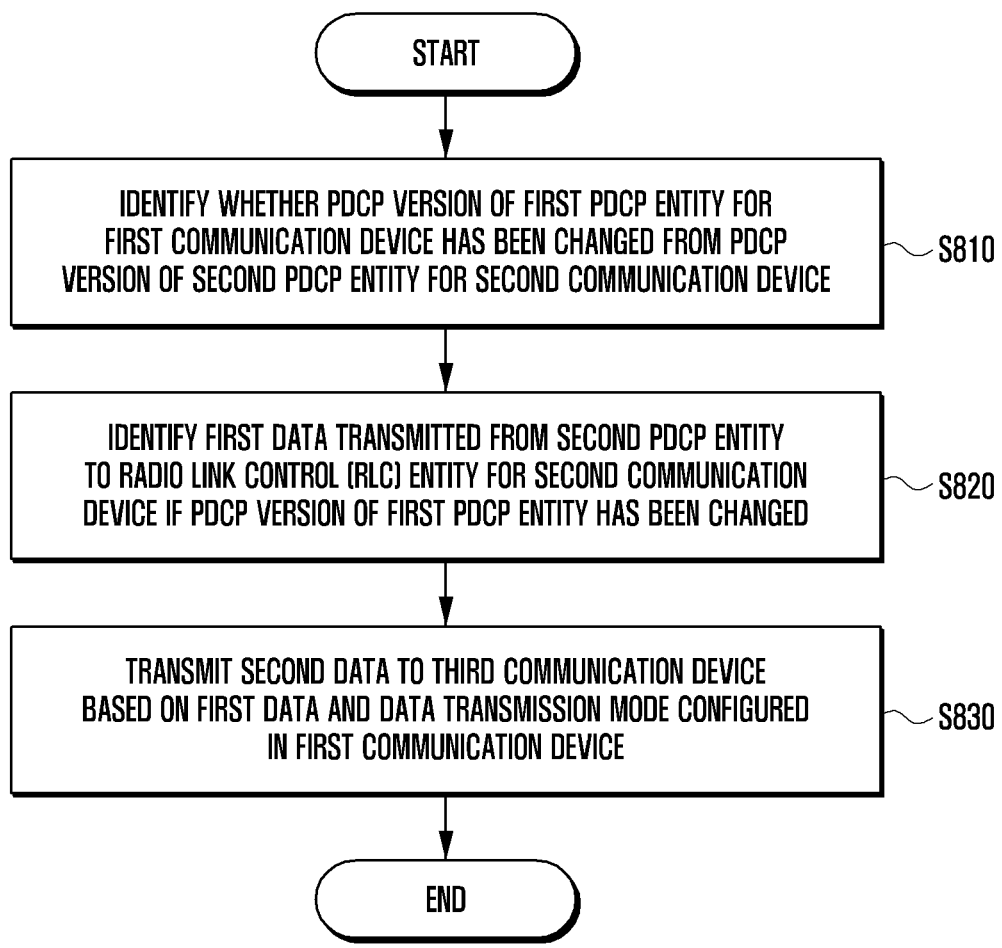
FIG. 8 is a diagram illustrating an operation method of a communication device according to an embodiment of the disclosure.

FIG. 8 is a diagram illustrating an operation method of a communication device according to an embodiment of the disclosure.

According to an embodiment, if the first communication device and the second communication device are implemented by different base stations, the third communication device may be implemented by a terminal, and if the first communication device and the second communication device are implemented by different terminals, the third communication device may be implemented by a base station.

With reference to FIG. 8, at operation S810, in case of a packet data convergence protocol (PDCP) version change, the first communication device may identify whether a PDCP version of a first PDCP entity for the first communication device has been changed from a PDCP version of a second PDCP entity for a second communication device.

According to an embodiment, if the third communication device performs a handover from the second communication device to the first communication device or the third communication device is in dual connectivity with respect to the first communication device and the second communication device in a state where the first communication device and the second communication device belong to different networks, respectively, the PDCP version of the first PDCP entity may be changed from the PDCP version of the second PDCP entity.

According to an embodiment, the first PDCP entity and the second PDCP entity may be implemented by a common entity.

At operation S820, the first communication device may identify first data transmitted from the second PDCP entity to a radio link control (RLC) entity for the second communication device if the PDCP version of the first PDCP entity is changed.

According to an embodiment, the first communication device may receive data transmission status information from the second communication device, and may determine the first data transmitted from the second PDCP entity to the RLC entity based on the data transmission status information.

At operation S830, the first communication device may transmit second data to a third communication device based on the first data and a data transmission mode configured for the first communication device. In this case, the first communication device may give a new sequence number to the second data.

According to an embodiment, the first communication device may receive PDCP status information from the third communication device, and based on the PDCP status information, the third communication device may determine the second data by excluding the data successfully received from the second communication device.

According to an embodiment, if the data transmission mode is a first acknowledged mode (AM mode), the first communication device may determine the second data by excluding data for which an ack is sequentially received through an RLC automatic repeat request (ARQ) from the first data.

According to another embodiment, if the data transmission mode is a second SM mode, the first communication device may determine the second data by excluding the first data.

According to still another embodiment, if the data transmission mode is a third AM mode, the first communication device may receive, from the second communication device, information indicating that a buffer of the RLC entity is in an empty state, and may determine the second data by excluding the first data in response to the information.

According to still another embodiment, if the data transmission mode is a first unacknowledged mode (UM mode), the first communication device may determine the second data by excluding data for which a first timer expires from the first data.

According to still another embodiment, if the data transmission mode is a second UM mode, the first communication device may determine the second data by excluding the first data.

According to still another embodiment, if the data transmission mode is a third UM mode, the first communication device may determine the second data by excluding the first data in case that a second timer (suspending timer) expires.

Embodiments of the disclosure disclosed in the specification and drawings are merely used to present specific examples to easily explain the contents of the disclosure and to help understanding of the disclosure, but are not intended to limit the scope of the disclosure. Accordingly, it will be apparent to those of ordinary skill in the art to which the disclosure pertains that other modified examples derived based on the technical concept of the disclosure are possible in addition to the embodiments disclosed herein.

The invention claimed is:

1. A method performed by a first communication device in a wireless communication system, the method comprising:
   identifying whether a change event of a packet data convergence protocol (PDCP) version occurred;
   in case that the change event occurred, receiving, from a second communication device, first PDCP data that is buffered in a second PDCP entity of the second communication device and mapping information between a sequence number (SN) for the first PDCP data and an SN for a general packet radio service tunneling protocol (GTP), wherein the SN for the first PDCP data is detached in the first PDCP data, and wherein a downlink transmission of PDCP packet data units (PDUs) from the second PDCP entity of the second communication device to a radio link control (RLC) entity of the second communication device is stopped in case that the change event occurred;
   receiving, from a terminal, a PDCP status report including acknowledgement/negative-acknowledgement (ACK/NACK) information on the first PDCP data;
   identifying second PDCP data among the first PDCP data based on the PDCP status report and the mapping information, wherein the second PDCP data includes at least one PDCP PDU that has not been transmitted from the second PDCP entity to the RLC entity of the second communication device in case that the at least one PDCP PDU exists;
   determining the second PDCP data by excluding data for which an ACK is sequentially received through an RLC automatic repeat request (ARQ) from the first PDCP data in case that a data transmission mode of the first communication device is a first acknowledged mode (AM mode);
   allocating an SN for the second PDCP data; and
   transmitting, to the terminal, the second PDCP data.

2. The method of claim 1, further comprising:
   determining the second PDCP data by excluding from the first PDCP data PDCP PDUs that have been transmitted from the second PDCP entity to the RLC entity of the second communication device, in case that the data transmission mode is a second AM mode.

3. The method of claim 1, further comprising:
   receiving, from the second communication device, information indicating that a buffer of the RLC entity is in an empty state in case that a data transmission mode of the first communication device is a third AM mode; and
   determining the second PDCP data by excluding from the first PDCP data in response to the information PDCP PDUs that have been transmitted from the second PDCP entity to the RLC entity of the second communication device.

4. The method of claim 1, further comprising:
   determining the second PDCP data by excluding data for which a first timer expires from the first PDCP data in case that a data transmission mode of the first communication device is a first unacknowledged mode (UM mode);
   determining the second PDCP data by excluding from the first PDCP data PDCP PDUs that have been transmitted from the second PDCP entity to the RLC entity of the second communication device, in case that the data transmission mode is a second UM mode; and
   determining the second PDCP data by excluding from the first PDCP data PDCP PDUs that have been transmitted from the second PDCP entity to the RLC entity of the second communication device, in case that a second timer expires if the data transmission mode is a third UM mode.

5. The method of claim 1, further comprising giving a new SN to the second PDCP data.

6. The method of claim 1, wherein in case that the terminal performs a handover from the second communication device to the first communication device or the terminal is in dual connectivity with respect to the first communication device and the second communication device in a state where the first communication device and the second communication device each belong to different networks, a PDCP version of a first PDCP entity of the first communication device is changed from a PDCP version of the second PDCP entity.

7. The method of claim 1, further comprising:
   receiving, from the second communication device, data transmission state information; and determining PDCP PDUs among the first PDCP data that have been transmitted from the second PDCP entity to the RLC entity of the second communication device based on the data transmission state information.

8. A first communication device in a wireless communication system, the first communication device comprising:
a transceiver; and
a controller coupled with the transceiver, and configured to:
identify whether a change event of a packet data convergence protocol (PDCP) version occurred,
in case that the change event occurred, receive, from a second communication device, first PDCP data that is buffered in a second PDCP entity of the second communication device and mapping information between a sequence number (SN) for the first PDCP data and a SN for a general packet radio service tunneling protocol (GTP), wherein the SN for the first PDCP data is detached in the first PDCP data, and wherein a downlink transmission of PDCP packet data units (PDUs) from the second PDCP entity of the second communication device to a radio link control (RLC) entity of the second communication device is stopped in case that the change event occurred,
receive, from a terminal, a PDCP status report including acknowledgement/negative-acknowledgement (ACK/NACK) information on the first PDCP data,
identify second PDCP data among the first PDCP data based on the PDCP status report and the mapping information, wherein the second PDCP data includes at least one PDCP PDU that has not been transmitted from the second PDCP entity to the RLC entity of the second communication device in case that the at least one PDCP PDU exists,
determine the second PDCP data by excluding data for which an ACK is sequentially received through an RLC automatic repeat request (ARQ) from the first PDCP data in case that a data transmission mode of the first communication device is a first acknowledged mode (AM mode),
allocate an SN for the second PDCP data, and
transmit, to the terminal, the second PDCP data.

9. The device of claim 8, wherein the controller is configured to:
determine the second PDCP data by excluding from the first PDCP data PDCP PDUs that have been transmitted from the second PDCP entity to the RLC entity of the second communication device, in case that the data transmission mode is a second AM mode, and
control to receive, from the second communication device, information indicating that a buffer of the RLC entity is in an empty state in case that the data transmission mode is a third AM mode, and determine the second PDCP data by excluding from the first PDCP data in response to the information PDCP PDUs that have been transmitted from the second PDCP entity to the RLC entity of the second communication device.

10. The device of claim 8, wherein the controller is configured to:
determine the second PDCP data by excluding data for which a first timer expires from the first PDCP data in case that a data transmission mode of the first communication device is a first unacknowledged mode (UM mode),
determine the second PDCP data by excluding from the first PDCP data PDCP PDUs that have been transmitted from the second PDCP entity to the RLC entity of the second communication device, in case that the data transmission mode is a second UM mode, and
determine the second PDCP data by excluding from the first PDCP data PDCP PDUs that have been transmitted from the second PDCP entity to the RLC entity of the second communication device, in case that a second timer expires if the data transmission mode is a third UM mode.

11. The device of claim 8, wherein in case that the terminal performs a handover from the second communication device to the first communication device or the terminal is in dual connectivity with respect to the first communication device and the second communication device in a state where the first communication device and the second communication device each belong to different networks, a PDCP version of a first PDCP entity of the first communication device is changed from a PDCP version of the second PDCP entity.

12. The device of claim 8, wherein the controller is configured to:
control to receive data transmission state information from the second communication device; and
determine PDCP PDUs among the first PDCP data that have been transmitted from the second PDCP entity to the RLC entity of the second communication device based on the data transmission state information.

* * * * *